United States Patent Office 3,448,164
Patented June 3, 1969

3,448,164
OLEFIN SKELETAL ISOMERIZATION
AND CATALYST
Vernon C. F. Holm and George J. Nolan, Bartlesville, Okla., assignors to Phillips Petroleum Company, a corporation of Delaware
No Drawing. Filed Sept. 21, 1967, Ser. No. 669,414
Int. Cl. C07c 3/16
U.S. Cl. 260—683.2         5 Claims

ABSTRACT OF THE DISCLOSURE

Olefins are isomerized by contacting with an aluminum phosphate and titanium-containing catalyst.

Background of the invention

This invention relates to a method of preparing a supported aluminum phosphate catalyst, to the novel catalyst prepared by the method, and to the catalytic conversion of hydrocarbon such as isomerization with the novel catalyst.

In accordance with another aspect, this invention relates to a method for increasing the surface area of metal oxide gels by the addition of aluminum phosphate. In accordance with a further aspect, this invention relates to a novel high surface area aluminum phosphate-titanium catalyst. In accordance with a still further aspect, this invention relates to skeletal isomerization of olefins with a catalyst of the invention.

Branched olefins are useful materials which can be used for the production of polymers, high octane fuels, and other valuable chemicals such as isoprene. The present invention provides a novel process by which isomerizable olefins, such as linear olefins, can be converted to other olefins including branched olefins. A surprising feature of the present invention is that it utilizes a catalyst containing aluminum phosphate. Although aluminum phosphate is essentially inactive for the skeletal isomerization of olefins, its presence in accordance with the invention results in improved catalytic activity.

Accordingly, it is an object of this invention to provide a supported aluminum phosphate catalyst having high surface area.

Another object of this invention is to provide an improved process for converting or isomerizing hydrocarbons.

Other aspects, objects as well as the several advantages of the invention will become apparent to one skilled in the art upon consideration of the accompanying disclosure and appended claims.

Summary of the invention

The present invention stems from the unexpected discovery that the surface area of certain catalytic materials, such as metal oxide gels and the like, can be increased far more than would be expected on an additive basis by incorporating aluminum phosphate into the structure. The combination of aluminum phosphate with such materials has resulted in an increase of surface area by as much as 50 to 100 percent. This discoverey has given rise to material much more active for catalytic conversions. Consequently, in the field of skeletal isomerization of olefins, the catalytic ability of poor isomerization catalyst, as well as the materials known to exhibit substantial skeletal isomerization activity, can be substantially improved by this enhancement of surface area.

In accordance with one embodiment, the skeletal isomerization catalysts of the present invention are those which contain from about 5 to about 95 weight percent aluminum phosphate, the remainder being titanium-containing materials such as titania, titanium molybdate, titanium tungstate, titanium phosphotungstate, and titanium phosphomolybdate.

These materials can be prepared by any of the well known conventional methods for preparing aqueous insoluble compounds. A presently preferred method consists of coprecipitating the titanium metallates or titanium oxide and aluminum phosphate. Other methods will be readily apparent to those skilled in the art of heterogeneous catalyst preparation.

The precipitated catalyst components or gel can be washed and dried and shaped by molding, extrusion, or tableting under high pressure. Catalyst is calcined prior to use at temperatures in the range 250 to 800° C.

The catalysts of the invention will have surface areas of at least 150 m.$^2$/g., preferably 180 to 200 m.$^2$/g.

The olefins which are applicable for the use of the present invention are those isomerizable olefins having from about 4 to about 10 carbon atoms. Same examples of these are butene-1, butene-2, 2-methylbutene-1, pentene-1, pentene-2, hexene-1, 3-methylhexene-1, hexene-2, hexene-3, cyclohexene, 1-methylcyclopentene, heptene-2, heptene-3, octene-1, octene-4, nonene-2, nonene-4, nonene-1, decene-1, decene-3, decene-4, and the like, and mixtures thereof. The presently preferred olefins are the linear acyclic olefins.

According to the process of the present invention, the olefin feed is contacted with the catalyst at a temperature in the range from about 400 to about 1000° F., preferably from about 700 to about 900° F. The pressure is not believed critical and any convenient pressure, including atmospheric pressure, can be used. Any conventional contacting technique can be used such as fixed or fluidized bed operation. The olefin conversion is preferably carried out continuously in the vapor phase, at space rates in the general range from about 50 to about 1000 gaseous hourly space velocity.

After contact with the catalysts of the present invention, the reaction mixture can be separated by conventional means, unconverted materials being recycled to the reaction zone.

The invention can be further illustrated by the following example.

EXAMPLE I

Butene-2 was contacted with a coprecipitated aluminum phosphate-titania oxide catalyst. The preparation of the catalyst was begun by the preparation of three solutions.

Solution I was prepared by the slow addition of 11.9 g. of aluminum chloride to 300 ml. water.

Solution II was prepared by the addition of 128 g. (74.5 ml.) TiCl$_4$ to cold water cooled by means of an ice bath. This solution was then diluted with additional water to a total of about 300 ml.

Solution III was prepared by the addition of 6.5 g. (NH$_4$)$_2$HPO$_4$ to 183 ml. concentrated NH$_4$OH (about 25 percent) and diluted to about 1600 ml. with water.

Solution I was placed in an ice bath and the titanium-containing Solution II was added very slowly with stirring. This mixture was then added to Solution III with stirring, followed by the addition of 38 additional ml. of NH$_4$OH to give the mixture a pH of 7.4. A thick gelatinous precipitate formed immediately. It was allowed to stand for about 1½ hours, then placed on a Buchner funnel and drained with suction. The precipitate was washed with water and similarly drained, then dried under a heat lamp followed by additional drying in an oven at 110° C. The solid was again washed with water, drained, and dried in an oven at 110° C. The solid was then calcined at 500° C. for five hours, yielding a catalytic material having a surface area of about 207 m.$^2$/g.

The above-prepared catalyst (10 AlPO$_4$–90 TiO$_2$ was then used in the conversion of butene-2 in a fixed bed reactor at atmospheric pressure, at 200 GHSV, and at a temperature of 900° F. After being on stream for about 15 minutes, a sample of the reactor effluent was taken and analyzed by gas-liquid chromatography. It was found that, at a butene conversion of about 28 percent, about 3.5 weight percent of the effluent was isobutene.

For purposes of comparison, a similar test was carried out using titanium dioxide gel as the sole catalyst. The titania gel, having a surface area of 100 m.$^2$/g., was similarly prepared by the addition of TiCl$_4$ to cold water followed by treatment with NH$_4$OH, precipitation, filtration, washing, drying, and calcining at 500° C. When tested for butene conversion, under the same conditions, the butene conversion was found to be 15 percent with only about 0.4 weight percent of the effluent consisting of isobutene. Aluminum phosphate gel was an even poorer catalyst, being essentially inactive for the skeletal isomerization of butene.

EXAMPLE II

To further illustrate the enhanced surface areas of coprecipitated aluminum phosphate-titanium oxide compositions, several other coprecipitated compositions containing different proportions of aluminum phosphate were prepared using the same procedure described in Example I. For purposes of comparison, precipitated aluminum phosphate and precipitated titania gels were also produced. The titania gel was prepared as described in Example I.

The aluminum phosphate was prepared by reacting a solution of Al(NO$_3$)$_3$·9H$_2$O with a solution of (NH$_4$)$_2$HPO$_4$. Prior to mixing, ammonium hydroxide was added to the phosphate solution in an amount necessary to produce a pH of about 7 in the reaction mixture. The phosphate solution was then added to that of the aluminum nitrate during vigorous stirring. The gel-like precipitate was allowed to stand 30 minutes after which it was filtered with suction and then dried slowly under heat lamps overnight. The resulting granules were washed four times by decantation with distilled water and dried again.

After calcination at 500° C. for 5 hours, the above compositions (about 20 mesh size) were measured for surface area by the conventional B.E.T. method using nitrogen adsorption at liquid nitrogen temperatures. The results of these measurements are shown in the following table. The composition of the mixture, as in Example I, is in weight percent.

| Composition: | Surface area, m.$^2$/g. |
| --- | --- |
| TiO$_2$ | 100 |
| 10 AlPO$_4$–90 TiO$_2$ | 207 |
| 20 AlPO$_4$–80 TiO$_2$ | 208 |
| 40 AlPO$_4$–60 TiO$_2$ | 183 |
| 60 AlPO$_4$–40 TiO$_2$ | 201 |
| 80 AlPO$_4$–20 TiO$_2$ | 182 |
| 90 AlPO$_4$–10 TiO$_2$ | 150 |
| AlPO$_4$ | 98 |

These data show the unexpected enhancement of surface area of coprecipitated compositions of AlPO$_4$ and TiO$_2$.

We claim:
1. A process for olefin skeletal isomerization of a feed containing isomerizable C$_4$ to C$_{10}$ olefins which comprises contacting said olefin under isomerizing conditions with a catalyst containing from 5 to 95 weight percent aluminum phosphate and the remainder being titania, said catalyst having a surface area of at least 150 m.$^2$/g.

2. A process according to claim 1 wherein said catalyst is AlPO$_4$–TiO$_2$ having a surface area of 180–220 m.$^2$/g.

3. A process according to claim 1 wherein said hydrocarbon is butene-2.

4. As a new composition a catalyst of high surface area of at least 150 m.$^2$/g. comprising 5 to 95 weight percent aluminum phosphate and the remainder being TiO$_2$.

5. A catalyst according to claim 4 wherein said catalyst is coprecipitated.

References Cited
UNITED STATES PATENTS

| | | | |
| --- | --- | --- | --- |
| 2,537,283 | 1/1951 | Schaad | 260—683.2 |
| 3,211,801 | 10/1965 | Holm | 260—683.2 |
| 3,304,343 | 2/1967 | Mitsutani | 260—683.2 |
| 3,365,405 | 1/1968 | Fufui | 252—437 |

DELBERT E. GANTZ, Primary Examiner.

V. O'KEEFE, Assistant Examiner.

U.S. Cl. X.R.

252—437